July 16, 1940.　　　　T. ZUSCHLAG　　　　2,208,145
MAGNETIC ANALYSIS
Filed June 22, 1937　　　3 Sheets-Sheet 1

INVENTOR
Theodor Zuschlag
BY
ATTORNEYS

July 16, 1940. T. ZUSCHLAG 2,208,145
MAGNETIC ANALYSIS
Filed June 22, 1937 3 Sheets-Sheet 2

INVENTOR
Theodor Zuschlag
BY
Pennie, Davis, Marvin & Edmonds
ATTORNEYS

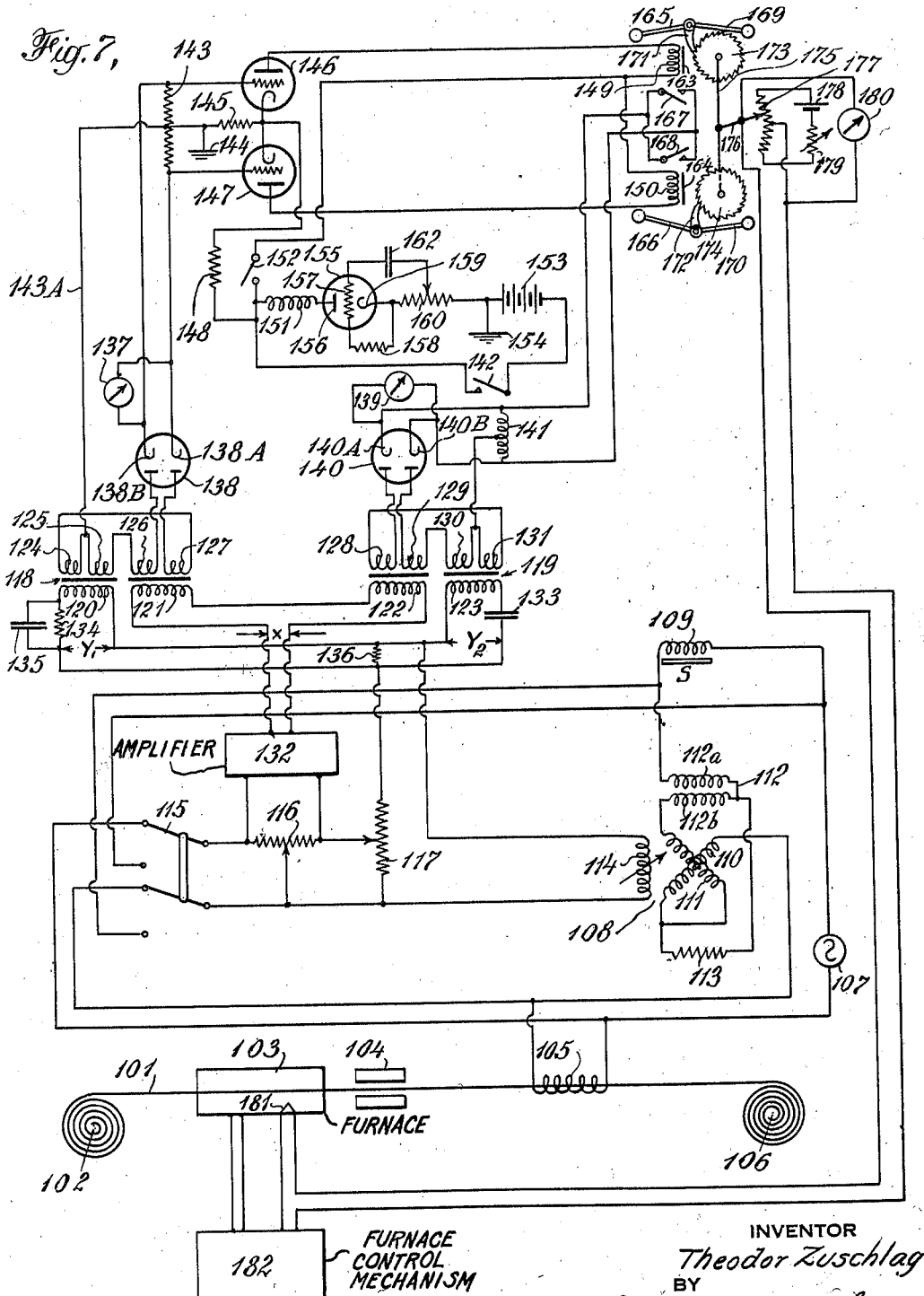

Patented July 16, 1940

2,208,145

UNITED STATES PATENT OFFICE 2,208,145

MAGNETIC ANALYSIS

Theodor Zuschlag, West Englewood, N. J., assignor to Magnetic Analysis Corporation, Long Island City, N. Y., a corporation of New York Application June 22, 1937, Serial No. 149,575

18 Claims. (Cl. 175—183)

This invention relates to magnetic analyses and provides a novel method of and apparatus for determining the physical and metallurgical characteristics of magnetizable bodies. The invention is concerned primarily with the determination of the physical and metallurgical characteristics throughout an elongated magnetizable body, and aims to secure uniform and desired characteristics throughout the length of such a body.

The invention represents an improvement in the method of and apparatus for electrical measurement described in my copending application Serial Number 33,853, filed July 30, 1935, of which this is a continuation in part.

In the aforementioned copending application I have described an apparatus for the determination of amplitude and phase variations between alternating electrical potentials. This apparatus comprises a plurality of transformers, to the primary coils of which the alternating current or currents undergoing investigation may be supplied. The transformers are adapted to produce two secondary currents, one proportional to a power of the vector summation of the potentials undergoing investigation, the other proportional to a power of the vector difference of the potentials undergoing investigation. A bridge net work provided with rectifiers is connected to the secondary coils of the transformers. A direct current indicating means is connected to the bridge in such a way as to measure the difference between the rectified currents flowing in opposite legs of the bridge.

It is known that electrical potentials imposed upon a circuit in inductive relationship with a magnetizable body are influenced by the physical and metallurgical characteristics of the body. With this in mind I have provided a novel means of analyzing such electrical potentials. In one practice of my invention successive portions of a long magnetizable strip are first heated to an appropriate temperature, quenched, and passed in inductive relationship with a test coil through which an alternating potential is imposed. The amplitude or phase of the alternating potential in the test coil varies in response to variations in physical properties of the material disposed in inductive relationship therewith. The potential thus influenced is opposed to a secondary artificial potential, the phase and amplitude of which corresponds to those which would be manifested in the test coil if the material passing through the test coil possessed the desired physical and metallurgical property. If the two potentials thus opposed are identical, the resultant potential is zero, indicating that proper conditions of heat treatment are being maintained. If the two potentials are unequal, a differential potential results which reflects deviations of both phase and amplitude. The differential potential, for convenience of description, is hereinafter designated as X.

The X or differential potential is then utilized together with another potential, hereinafter designated as $Y_1$, to induce a secondary current, which is rectified and measured. Simultaneously another secondary current is induced by means of the X potential and a third, or $Y_2$ potential, which should preferably correspond in frequency to the X and $Y_1$ potential but should be displaced in phase from the $Y_1$ potential by a constant angle, say 90°. This secondary current is also rectified. For purposes of discussion the $XY_1$ secondary current is hereinafter referred to as the "in phase component", while the $XY_2$ secondary current is described as the "out of phase component."

Both in phase and out of phase components may be measured with appropriate direct current indicating means such as galvanometers. They may also be introduced into an electrical circuit so arranged that one component alone, or both together, depending upon the arrangement, will operate to adjust the amount and sign of a direct current potential introduced into a furnace control circuit. The resultant variations in the furnace control circuit in turn may operate to change appropriately the amount of heat introduced into the magnetizable material passing through the furnace, either by varying the temperature of the furnace or the rate of travel of the material. In this way the degree of heat treatment is correlated to the physical properties of the product so that substantial uniformity between succeeding portions of the product is obtained.

In a presently preferred practice of my invention regulation of the amount of heat introduced into the material in the furnace is deferred until it appears that a substantial, persistent, and undesirable change has occurred in the nature of the quenched material. Over-regulation is thus prevented.

In the practice of the above-described method I prefer to employ an apparatus which comprises a test coil adapted to be energized by an alternating current and to be disposed in inductive relationship with successive portions of the magnetizable material almost immediately after quenching, a means for creating a secondary potential having a predetermined phase and amplitude, a network wherein the potential of the test coil may be balanced against the secondary potential, a pair of mixer transformers equipped with appropriate rectifiers, and a circuit or circuits with appurtenant apparatus, wherein the secondary currents derived from the mixer transformers may be determined or employed to vary the amount of heat introduced into the material in a furnace or other heating means.

These and other features of the apparatus and method of my invention will be more thoroughly understood if reference is made to the following description, taken in conjunction with the accompanying drawings, in which:

Fig. 7 is a schematic representation of a presently preferred form of magnetic analysis apparatus of my invention adapted to the control of heat treatment of magnetizable bodies.

Figure 1:
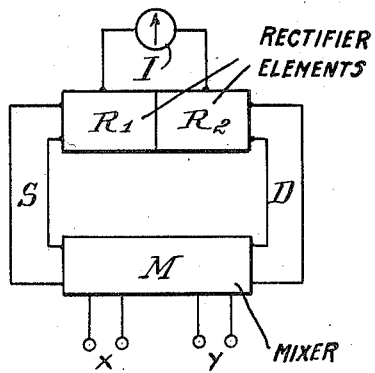
Fig. 1 is a schematic diagram illustrative of certain principles of my invention.

Referring now to Fig. 1, it will be seen that the apparatus comprises an electrical mixer circuit M to which are supplied two alternating currents X and Y, preferably having the same frequency. Currents X and Y may differ from each other in amplitude and may be displaced from each other in phase by an angle $\phi$. The angle $\phi$ may be a constant or a variable, depending upon the particular alternating currents undergoing measurement. The currents X and Y applied to the mixer M are combined in such a way that the secondary output of the mixer comprises two currents, S and D, which represent the vector summation and the vector difference, respectively of the currents X and Y. The resultant currents S and D are applied respectively to a pair of rectifier elements $R_1$ and $R_2$. The differential output of the rectifier pair is measured by means of the indicator I, connected across the rectifiers. The mixer unit and the rectifier units are so constructed and connected that no deflection of the indicator occurs when either current X or Y is applied alone or when the two currents are displaced from each other by a phase angle of 90°. This arrangement is illustrated in Fig. 2, to which reference is now made.

Figure 2:
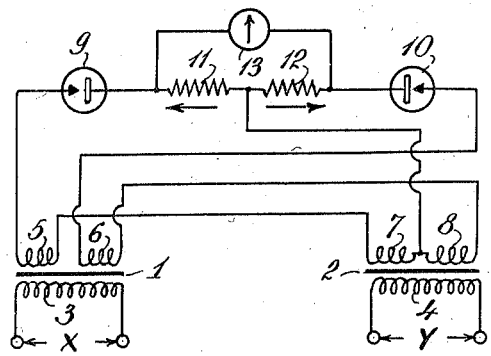
Fig. 2 is a schematic wiring diagram of an apparatus of my invention providing half wave rectification and adapted for physical and metallurgical analyzing of an alternating potential indicative of the characteristics of a magnetizable body.

In the apparatus illustrated by Fig. 2 the electrical mixer, mentioned in the description of Fig. 1, comprises a pair of transformers 1 and 2, to which are supplied the currents X and Y, respectively. The transformers 1 and 2 are provided with primary coils 3 and 4, respectively, and each transformer is provided with a pair of secondary coils 5, 6 and 7, 8 respectively. The primary coils should preferably be substantially identical, built of wire of low ohmic resistance. The secondary coils should be substantially identical and of low ohmic resistance. The secondary coil 5 of the transformer 1 is connected to the secondary coil 7 of transformer 2 in series addition. The secondary coil 6 of the transformer 1 is connected to the secondary coil 8 of the transformer 2 in series opposition. The free ends of coils 5 and 6 are connected respectively to a pair of half-wave rectifiers 9 and 10, which are connected to each other through a pair of resistances 11 and 12. The rectifiers 9 and 10 may be of the thermionic or of the copper oxide type. Preferably, though not necessarily, these rectifiers should be substantially equal in electrical characteristics, particularly in resistance to current flow.

A point on the connection between the coils 11 and 12 is connected to the free ends of secondary coils 7 and 8, so that a bridge circuit is formed with secondary coils 5 and 7, rectifier 9 and resistance 11 in one side of the bridge, and with secondary coils 6 and 8, rectifier 10, and resistance 12 forming the other side of the bridge. A direct current indicating instrument 13, such as a galvanometer, is shunted across the resistances 11 and 12.

In the arrangement illustrated in Fig. 2, care must be taken to connect the rectifiers so that they pass current in the direction indicated by the arrows, that is, only from the rectifiers directly to the respective resistances. Otherwise, the difference between rectified currents in the two bridge legs will not be measured.

As previously indicated, the secondary circuit is arranged so that no deflection of the indicator occurs if only one primary coil is energized, or if the energizing currents X and Y are 90° out of phase with each other. Assume, for example, that only current X is introduced into the apparatus. If the resistances of the two parallel circuits 5, 7, 11, 9, and 6, 8, 12, 10 are equal, then at any instant the currents flowing in the two circuits are represented only by the current induced in coils 5 and 6. These currents are equal and opposite so that the net current which the indicator 13 can record is zero. On the other hand, if only current Y is introduced into the apparatus, the currents in the two parallel secondary circuits 5, 7, 11, 9 and 6, 8, 10, 12 are equal but not opposite, i. e., when the current in one is positive, that in the other is also positive. However, the presence of the rectifiers in the circuits prevents the passage of a half wave of current in one circuit, so that the result impressed across the indicator is only the half wave induced in the other circuit. By using a direct current type of indicator, the needle of which is damped, no indication is noted because the current reverses in such a short time that only an inappreciable movement of the needle, or other damped indicating means occurs.

When currents X and Y are 90° out of phase with each other no indication results on the instrument, because at any instant the resultant current in coils 5 and 7 is equaled by that in coils 6 and 8, as may be demonstrated on a simple vector diagram.

In the event that the resistance of coils 5 and 7 and the rectifier 9 is equal to that of coils 6 and 8 and rectifier 10, then the resistances 11 and 12 may be equal. This, however, is not the usual case, because in practical apparatus some lack of symmetry between the two sides of the bridge is almost always encountered. For this reason, the values of resistances 11 and 12 are adjusted to give equal resistances on both sides of the bridge.

Figure 3:
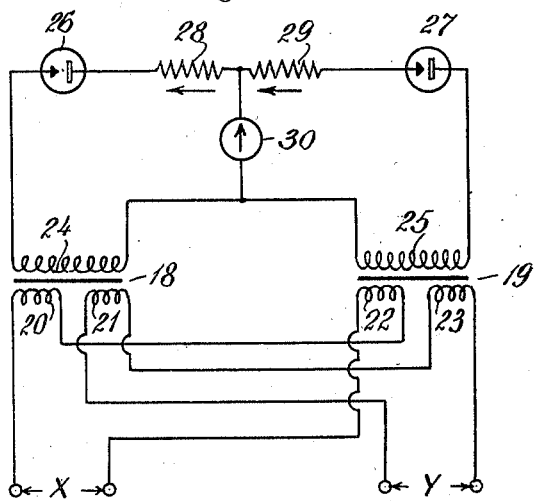
Fig. 3 is a schematic wiring diagram of a modified form of apparatus of my invention providing half wave rectification and adapted for the same uses as the apparatus of Fig. 2.

As has been stated, in the apparatus of Fig. 2, the rectifiers are connected so as to pass current only toward the resistances. If one of the rectifier units is reversed, so that one passes current toward the resistances, while the other passes current in a direction away from the resistances, it becomes necessary to change the arrangement of the apparatus, as illustrated by Fig. 3, wherein a pair of transformers 18 and 19 are provided respectively with two sets of primary coils 20, 21 and 22, 23 and with single secondary coils 24 and 25 respectively. In this arrangement the primary coil 20 of the transformer 18 and the primary coil 22 of the transformer 19 are connected in series opposition with the current X, and the primary coil 21 of the transformer 18 is connected in series addition with the primary coil 23 of the transformer 19. Current is supplied to the primary coils 21 and 23 from the source Y. The secondary coils 24 and 25 are connected respectively with rectifiers 26 and 27, resistance 28 and 29, and a direct current indicating means 30. It will be seen that this arrangement comprises a bridge, in one-half of which is located a secondary coil, a rectifier and a resistance, while the indicating means is located in that portion of the bridge which is common to both of the parallel circuits of the bridge. The rectifiers 26 and 27 are connected so that both pass current in the same direction, that is, either clockwise or counter-clockwise.

The mixer combination shown in Fig. 3 differs from the mixer combination of Fig. 2 principally as to the functions of the primary and secondary windings of the transformers. In Fig. 2 the mixing is accomplished by means of the secondaries of the transformers 1 and 2. In the apparatus of Fig. 3 the currents X and Y are combined by means of the primary windings. Because the primaries 20 and 22 are connected in series opposition, while the primaries 21 and 23 are connected in series addition, the output of the secondary coil 24 represents the vector sum and the output of the secondary 25 represents the vector difference of the two currents X and Y. The result produced in the apparatus of Fig. 3, is therefore the same as that of the apparatus of Fig. 2. In other words, the apparatus of Fig. 2 and Fig. 3 perform precisely the same functions, and their mixer and rectifier sections are interchangeable. As in the case of the apparatus of Fig. 2, when either the current X or Y is omitted there is no indication of current at the indicator 30 of Fig. 3. Similarly, if the currents X and Y are 90° out of phase with each other, there is no indication at the indicator 30.

The functions of the apparatus illustrated in Figs. 2 and 3 are somewhat different, although the underlying principle is the same and both apparatus accomplish the same net result. In the apparatus of Fig. 2, the product of the potentials and the phase angle is obtained by inducing two secondary currents with each of the primary currents X and Y. A secondary current induced by the current X is combined in series addition with a secondary current induced by the current Y. At the same time a secondary current induced by the current X is combined in series opposition with a secondary current induced by the current Y. In the apparatus of Fig. 3 the combined secondary current and the differential secondary current are obtained in a somewhat different manner. A plurality of fluxes produced by the current Y are combined and opposed respectively with a plurality of fluxes produced by the current X. The combined fluxes are utilized to induce one secondary current and the opposed fluxes are utilized to induce another secondary current which are then rectified in two parallel circuits and the difference between the rectified currents is measured. In both cases, the effect is to produce secondary currents which are proportional respectively to the vector summation of the primary potentials and the vector difference of the primary potentials.

As indicated previously, the apparatus illustrated in Figs. 2 and 3 are limited in their application because only one-half of the alternating current wave is rectified and measured. Full wave rectification, which is frequently more advantageous, may be accomplished in apparatus as illustrated in Figs. 4 and 5.

Figure 4:
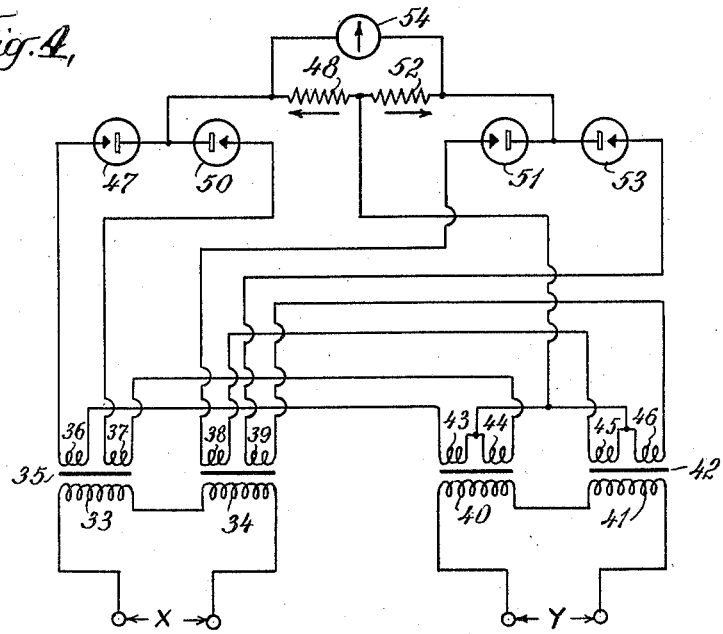
Fig. 4 is a schematic wiring diagram of an apparatus which employs the principles illustrated in Fig. 2 and is adapted to similar uses, but provides for full wave rectification.
Figure 5:
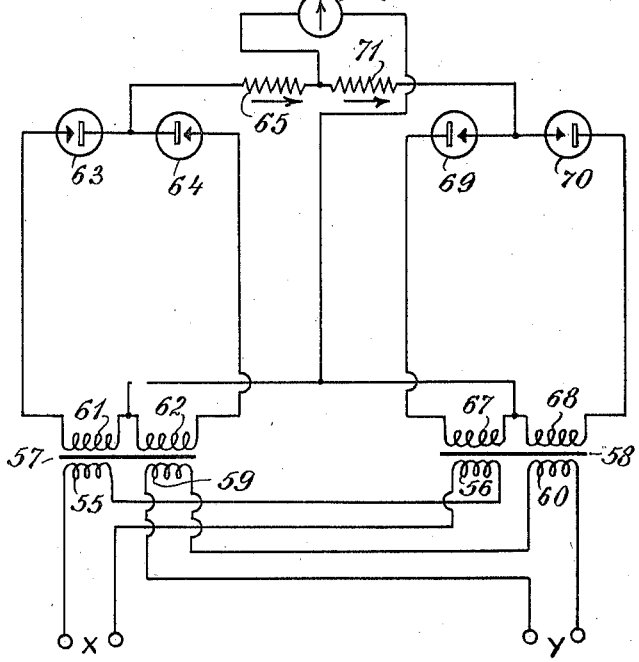
Fig. 5 is a schematic wiring diagram of an apparatus which employs the principles illustrated in Fig. 3 and is adapted to the same uses, but provides for full wave rectification.

Referring now to Fig. 4, it will be noted that the mixer circuit utilized in this arrangement is the same in principle as the one shown in Fig. 2. The current X is supplied to two substantially identical primary coils 33 and 34 of a transformer 35 connected in series. Placed in inductive relationship with primary coil 33 are two secondary coils 36 and 37, and two substantially identical secondary coils 38 and 39 are placed in inductive relationship with primary coil 34. In transformer 42 two primary coils 40 and 41 similar in construction to primary coils 33 and 34 are connected in series with the current source Y. A pair of substantially identical secondary coils 43 and 44 are placed in inductive relationship with primary coil 40 and two substantially identical secondary coils 45 and 46 are placed in inductive relationship with primary coil 41.

Secondary coil 36 is connected in series addition with secondary coil 43 and is also connected in series with rectifier 47 and resistance 48. Secondary coil 37 is connected in series opposition with secondary coil 44 and in series with a rectifier 50 and the resistance 48.

The other pairs of secondaries are similarly connected, that is, secondary 38 is connected in series addition with secondary 45 and in series with rectifier 51 and resistance 52. Secondaries 39 and 46 are connected in series opposition with each other and in series with rectifier 53 and resistance 52. A direct current type of indicator 54 is shunted across the resistance 48 and 44.

Considering now the apparatus illustrated in Fig. 5 (which is similar in principle to that illustrated in Fig. 3, but adapted for full wave rectification), it will be seen that current source X is connected to primary coils 55 and 56, one of which is located in each of two transformer units 57 and 58. Primary coils 55 and 56 are connected in series opposition. The current source Y is connected to primary coils 59 and 60 located in transformer units 57 and 58 respectively. Primary coils 59 and 60 are connected in series addition. Transformer unit 57 has two secondary coil portions 61 and 62, each of which is connected in series respectively with a rectifier 63, 64 and in parallel with each other to a resistance 65 and a direct current indicating instrument 66. Transformer unit 58 also has two secondary coil portions 67 and 68, which are connected in series with rectifiers 69 and 70 respectively and in parallel with each other to a resistance 71 and the instrument 66. In other words, the secondary circuit illustrated in Fig. 5 comprises a bridge, in the common leg of which is located the indicator 66. Each leg comprises two secondary coil portions in series, respectively, with two rectifiers and in parallel with each other. A resistance is located in each leg of the bridge.

In order that the apparatus illustrated in Figs. 4 and 5 may operate correctly, the rectifiers must be connected to transmit current only in the directions indicated by the arrows, that is, rectifiers 47, 51, 63, 70 should be connected to transmit current clockwise when rectifiers 50, 53, 64, and 69 transmit current counterclockwise.

As previously indicated, the apparatus illustrated by Figs. 4 and 5 correspond in principle of operation to those illustrated by Figs. 2 and 3, respectively, and differ from these apparatus chiefly in that they are adapted to measure fully rectified current. Because the apparatus illustrated in Figs. 4 and 5 utilize the full cycles of the impressed currents X and Y, they are more sensitive than the previously described half wave rectifier arrangements of Figs. 2 and 3.

In the modifications adapted to half wave rectification and illustrated in Figs. 2 and 3, an interruption of the current flow X produces equal and opposite rectified currents, and, therefore, produces no deflection of the indicator. On the other hand, an interruption of the current flow Y in the apparatus illustrated by Figs. 2 and 3 does not produce equal and opposite rectified currents in the secondary circuit, but the use of a damped indicator prevents any deflection because the direction of current flow reverses before an appreciable movement of the indicator can take place. In the apparatus illustrated by Figs. 4 and 5, an interruption of either current X or Y produces a balanced condition in the secondary circuit, so that no deflection of the indicator can take place.

When the half wave arrangement illustrated by Figs. 2 and 3 are used, the indicator is affected only by such current components as are in phase with each other and is not influenced by any 90° out of phase components of the impressed alternating currents X and Y. The full wave rectifier combinations, however, measure the total rectified amplitude of the two current combinations but do not register 90° phase displaced current components because the resultant amplitudes for the vector sum and the vector difference of 90° phase displaced components are equal.

An important feature of the invention is the fact that the apparatus itself acts as a filter under certain conditions, so that other filter means are not necessary to suppress harmonics of the base frequency. Thus, if either of the currents X and Y introduced into the apparatus is free from harmonics other than the basic one, the resultant measurement is not affected by any harmonics in the other current. This result is obtained for the same reason that no indication is obtained when either of the current values X or Y is interrupted. In other words, before harmonics can influence the reading of the instrument, similar harmonics must be present in both currents X and Y. If a harmonic is present only in the current X, then it creates equal and opposite effects in the secondary circuit. If the harmonic is present only in the current Y, it produces equal and opposite effects in the secondary circuits illustrated in Figs. 4 and 6, and although it does not produce equal and opposite effects in the circuits illustrated by Figs. 2 and 3, the indicator does not change, because the damping effect prevents any appreciable movement during the short time interval before the sign of the current reverses. It will be clear that the fact that the apparatus itself suppresses harmonics is of great advantage in investigation of commercial alternating currents, which are usually rich in harmonics.

Figure 6:
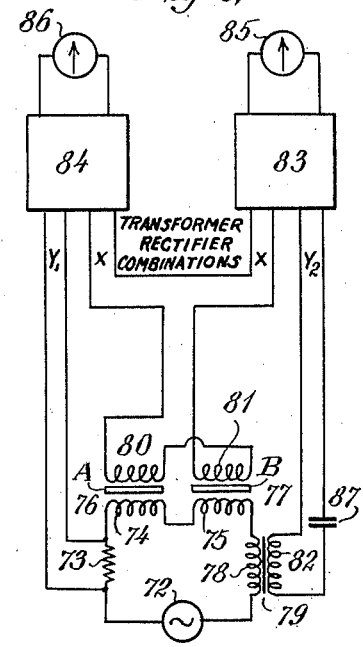
Fig. 6 illustrates a preferred application of the invention to the measurement of alternating current phenomena occurring in magnetic analysis.

Fig. 6 illustrates an application of the invention to magnetic analysis. The apparatus illustrated in Fig. 6 is adapted for two-component analysis of a differential secondary current resulting from differences in the metallurgical and physical characteristics of a plurality of magnetizable bodies, for example, steel specimens.

As shown in Fig. 6, a source of alternating current 72 is connected in series with a resistance 73, the primary coils 74 and 75, respectively, of two air core transformers 76 and 77, and the primary coil 78 of a phase shifter 79. The phase shifter 79 is adapted to produce a current which is uniformly 90° out of phase with the source 72. The phase shifter may be of any convenient construction, as long as it produces this result. In the apparatus illustrated this result is obtained with an ordinary transformer 79, having a condenser 87 in series with its secondary coil 82. The transformers 76 and 77 have secondary coils 80 and 81 disposed in inductive relationship respectively with their primary coils 74 and 75. The transformers preferably should be of substantially identical construction, with air cores, so that magnetizable objects may be conveniently inserted into their respective fields.

A pair of transformer and rectifier combinations 84 and 83, with current indicating means 86 and 85 are provided. These combinations may correspond to any one of the apparatus illustrated in Figs. 2, 3, 5 or 6. Secondary coils 80 and 81 of the transformers are connected in series opposition with each other and in series with the primary coils of both transformer and rectifier combinations. In other words, the current X supplied to the apparatus illustrated in Figs. 2, 3, 4 and 5 is derived from secondary coils 80 and 81 of the transformers illustrated in Fig. 6. Current Y₁ for the transformer combination 84 is obtained directly from the primary current source 72 by means of leads tapped into the circuit 72, 73, 74, 75, 78, 87 on either side of the resistance 73, and therefore varies as the amperage in this circuit. Current Y₂, supplied to the transformer combination 83, is derived from a secondary coil 82 of the phase shifter 79, which is so constructed as to produce a current which is 90° out of phase with the primary current flowing in the circuit 72, 73, 74, 75, 78, 87. Direct current indicating means 86 and 85 are connected respectively to the transformer and rectifier combinations 84 and 83, in any of the ways illustrated in Figs. 2, 3, 4 and 5.

From the foregoing description of the apparatus, it will be seen that the transformer and rectifier combination 84 is supplied with two currents Y₁ and X. Y₁ varies as the amperage of the primary circuit and is in phase therewith. X represents the differential secondary current produced in the circuit 80, 81, 83, 84 as a result of differences in the metallurgical and physical properties of specimens inserted into the fields of the transformers 76 and 77. Assume that the two transformers are substantially identical and that no specimens are inserted. Any potentials induced in secondaries 80 and 81 will be equal and opposite so that the resultant current X is zero. If X current is zero, then no indication will result in either indicator 86 or 85, for the reasons given heretofore in the discussion of the apparatus of Figs. 2, 3, 4 and 5. Similarly, if two identical specimens A and B are inserted respectively in the fields of the transformers 76 and 77, the current X will be zero, and no indication will result at 85 or 86. If, however, the specimens A and B are not identical, a differential current X will be induced in the circuit 80, 81, 83, 84; currents $Y_1$ and X will both affect the transformer and rectifier combination 84, and the indicator 86 will show a current proportional to the product $Y_1 \cdot X \cdot \cos \phi$ where $\phi$ is the phase displacement between X and $Y_1$. Thus an indication of the "in phase" differences between specimens A and B may be noted.

The foregoing discussion of the currents introduced into the transformer and rectifier combination 84 and their effect upon the indicator 86 is also applicable to the other transformer and rectifier combination 83, except that in the latter case the current $Y_2$ is 90° out of phase with $Y_1$, so that the indicator 85 will show "90° out of phase" variations between specimens A and B.

In the art of magnetic analysis certain metallurgical properties of magnetizable specimens are apparent in the "in phase" or "watt" component of a secondary circuit, whereas others are manifested in the "out of phase" or "wattless" component of a secondary circuit. The apparatus of Fig. 6 enables the observer to observe both components simultaneously, and thus contributes substantially all the necessary information about an unknown specimen at once.

In the event that the presence of the specimens in the field of the transformers causes a variation in phase other than 90° or 0° in the current X as compared with the primary current, then part of this phase displacement will be indicated by both instruments 86 and 85. If no phase displacement is thus caused, then currents $Y_1$ and X will be in phase and the reading of the indicator 86 will be proportional to the product XY, the cosine of $\phi$ being zero. At the same time, no reading will be observed in the instrument 85, in that currents X and $Y_2$ will be 90° out of phase, so that their resultant (as heretofore explained in the discussion of the apparatus of Fig. 2) must be zero.

On the other hand, if the current X is in phase with the current $Y_2$ (as a result of a 90° change in phase displacement across transformers 76 and 77) then the reading at indicator 85 will be proportional to the product $XY_2$ and no reading will be observed at 86. Any other situation with respect to phase displacement across the transformers 76 and 77 due to the presence of specimens A and B will result in readings at both indicators 85 and 86.

The interpretation of the readings at 85 and 86 is accomplished according to the heretofore customary methods of magnetic analysis.

Referring now to Fig. 7, it will be seen that a strip or wire of steel or other magnetizable material 101 is unwound from a feed reel 102, and passed successively through a suitable furnace 103, quenching blocks 104, a test coil 105 and rewound on a receiving reel 106, which may be driven by a motor (not shown).

The furnace may be heated electrically, by a gas flame, or by other appropriate variable heating means. It should be of such design as to permit the continuous passage therethrough of the material undergoing treatment.

The quenching blocks may be of any suitable design as long as they are adapted to the rapid and continuous cooling of material passed through them.

The test coil is merely a coil of wire of low ohmic resistance, preferably of sufficient diameter to permit the material undergoing treatment to pass through the coil freely.

One end of the test coil is connected directly with a source of alternating current 107. The other end of the test coil is connected with the alternating current source through primary coils of a phase shifter 108 in series with a standard primary coil 109.

The phase shifter 108 comprises a pair of primary stator coils 110 and 111, preferably of identical construction and disposed adjacent each other at right angles. The stator coils are connected in series with each other and with the test coil. They are also connected in series with a mutual inductance 112, having two inductance coils 112a and 112b disposed side by side and connected in series. Shunted across one of the stator coils is a resistor 113, which may also be considered as connected in series with the test coil and the mutual inductance.

The mutual inductance and the resistor are so chosen as to cause a phase displacement of substantially 90° between the currents flowing in the two stator coils.

The remainder of the phase shifter comprises a rotor coil 114, which is disposed inductively adjacent the two stator coils and is movable in a plane parallel to the axes of the two stator coils. Preferably, the rotor coil is disposed so that its center is adjacent the cross formed by the two stator coils. The phase of the current induced in the rotor coil is dependent upon its angular disposition with respect to the two stator coils. By varying this angular disposition, the phase of the secondary current induced in the rotor coil can be adjusted to any value. In other words, the phase displacement between the secondary current induced in the rotor coil and the primary currents flowing in either of the stator coils may be varied at will.

As has been noted, the primary side of the phase shifter is connected with the test coil, the standard coil, and the current source to form a series circuit. The standard coil is preferably the physical and electrical equivalent of the test coil, and is adapted to receive a specimen S having the physical or metallurgical properties which are desired in the material subjected to heat treatment.

The apparatus is provided with a double pole, double-throw switch 115 whereby both ends of either the test coil or the standard coil may be connected to a first potentiometer 116. The switch leads are so arranged that one end of either the test coil or the standard coil is connected to one end of this first potentiometer, while the other end of the respective coil is connected to its slider and also to an end of a second potentiometer 117 and to an end of the rotor coil of the phase shifter. The slider of the second potentiometer is connected in series with the switch through the ends of the first potentiometer, so that a closed series circuit may be established either through the test coil, the switch, an end and the center tap of the second potentiometer, and the ends of the first potentiometer, or by appropriate movement of the switch through the standard coil, the switch, and end and the center tap of the second potentiometer and the ends of the first potentiometer.

The apparatus of Fig. 7 is provided with two mixer transformers 118 and 119, to each of which two potentials are supplied. The mixer transformers are similar to those of Fig. 4. As used in the instant apparatus, each transformer is provided with two primary coils, 120, 121 and 122, 123 respectively. In turn, each primary coil is inductively associated with two secondary coils, so that mixing transformer 118 contains four such secondaries 124, 125, 126, 127 and the other mixing transformer contains four other secondaries 128, 129, 130, 131.

Potential is supplied to one primary coil 121, 122, in each transformer from the output side of an amplifier 132, the input leads of which are connected to the ends of the first potentiometer 116.

Other potentials are supplied to the remaining primary coils 120, 123 in each transformer, these coils being connected in parallel with each other to the free end of the rotor coil 114 of the phase shifter and to the free end of the second potentiometer 117. Connected in series with the primary coil 123 is a condenser 133, and a second condenser 135 is connected in series with the other primary coil 120 of this pair. This second condenser is shunted by a resistance 134. A fixed resistance 136 is shunted across the circuit 123, 133, 134, 135, 120. The condensers 133, 135, the fixed resistance 136, and the resistance 134 are preferably so arranged and of such values that the potential supplied to the primary coil 123 is 90° out of phase with that supplied to the primary coil 120 in the other mixer transformer, the phase of the potential in this latter coil corresponding to that impressed across the coils 121 and 122. Because of this arrangement, "in phase" variations in the physical properties of the material undergoing investigation are reflected in the mixer transformer 118, while "out of phase variations" are reflected in the other mixer transformer 119.

Now considering the secondary or output sides of the mixing transformers, it will be seen that the two outer secondary coils of each transformer pair are connected to each other in series opposition, and that the two inner coils of each transformer are connected to each other in series addition. Because of this arrangement, the pairs connected in series opposition have an induced current proportional to the vector difference of the electromotive forces introduced into the primary coils of each mixing transformer, whereas the pairs of secondary coils connected in series addition have a current flow proportional to the vector summation of the electromotive forces introduced into the primary coils of the respective mixer transformers.

To be more specific, secondaries 124 and 127 are connected in series opposition to a plate of a diode thermionic rectifier tube 138, this circuit being completed through a companion cathode 138A of the rectifier tube and through one-half (the lower half in Fig. 7) of a center tap grid resistor 143 and a lead 143A which extends from the center tap of the grid resistor 143 to the common point between secondary coils 124 and 125. Secondaries 125 and 126 of the mixer transformer 118 are connected in series addition with each other through a plate and a companion cathode 138B of the rectifier tube 138. The circuit is completed through the upper half (in Fig. 7) of the grid resistor 143 and through the lead 143A.

A direct current indicating means 137 such as a galvanometer is connected across the cathodes 138A and 138B.

The arrangement of the secondaries in the other mixer-transformer 119 is similar to that of the mixer transformer 118. Coils 128 and 131 are connected in series opposition with each other through a plate and a companion cathode 140A of a diode thermionic rectifier tube 140, the circuit being completed through the upper half (in Fig. 7) of a center-tapped solenoid coil 141 of a solenoid switch 142 to the common point between the coils 130 and 131. Secondaries 129 and 130 are connected in series addition through a plate and a companion cathode 140B of the tube 140. The circuit through secondaries 129 and 130 is completed through the lower half (in Fig. 7) of the solenoid coil 141 to the common point between the coils 130 and 131.

The solenoid switch 142 is responsive only to direct current.

A second direct current indicating means 139 such as a galvonometer is connected across the cathodes 140A and 140B.

A pair of copper oxide rectifiers or other half-wave rectifiers may be substituted for each diode tube, or full wave rectifier, if desired (see Fig. 4).

The full wave rectifiers or thermionic valves provide for rectification of the currents induced in the secondaries of the two mixer transformers. As a result, the reading of indicator 137 is a function of the rectified difference between the vector summation and the vector difference of the potentials imposed upon primaries 120 and 121, while the reading of indicator 139 is a function of the rectified difference between the vector summation and the vector difference of the potentials imposed upon primaries 122 and 123. If there are no "in phase" or "out of phase" differences between the physical characteristics desired and the physical characteristics actually manifested by the material passing through the test coil, neither of the indicating instruments will be moved, i. e., both instruments will read zero.

My experiences in the art of magnetic analysis have indicated that differences in the hardness and thickness of material such as strip steel are revealed by "in phase" variations, whereas differences in strain and hardness are manifested by "out of phase" variations. Now minor differences in thickness of the material undergoing treatment are relatively inconsequential, and in any event they cannot be remedied by changing the heat input in the tempering operation. Similarly, minor differences in strain, while producing marked variations in the "out of phase" readings, from a practical standpoint do not actually affect the quality of strip steel except in unusual instances. For this reason, I have designed the apparatus of my invention in such a way that it does not disturb the heating conditions in the furnace except when both "in phase" and "out of phase" variations from the prescribed artificial potential are observed. In this way, the apparatus does not attempt to compensate for differences in thickness or strain alone. Much useless "hunting" or over-regulation by the apparatus is thus avoided. It will be understood, of course, that this feature is not essential to the operation of my invention. If it be found necessary or desirable, the automatic heat control mechanism (by suitable rearrangement) can be made to function in response to "in phase" variations, or "out of phase" variations, or both.

With this in mind, and again referring to Fig. 7, the furnace control apparatus (which functions in response to currents flowing through the indicators 137 and 139) will be described.

The center tap of the grid resistor 143 is connected to the common point between secondaries 124 and 125, and the upper and lower ends of the grid resistor 143 are connected respectively to the twin cathodes 138B and 138A. The center tap of the grid resistor is grounded (as shown at 144) and connected through a bias resistor 145 to the cathodes of a pair of grid-controlled glow tubes 146, 147. The cathode circuit through the tubes is completed by leads which connect the grids of the two tubes respectively to the ends of the center-tapped grid resistor 143.

The plates of tubes 146, 147 are connected respectively with the coils 149 and 150 of a pair of contact arm relays. The free ends of these coils are connected together so as to form the series circuit 146, 149, 150, 147.

The apparatus contains another control circuit adapted to energize a delay mechanism. This control circuit is connected to the common point between the cathodes of the tubes 146, 147 through a bleeder resistance 148, and considered as a series circuit comprises briefly, a delay relay 152, followed respectively by a triode grid-controlled tube or thermionic valve 155, a potentiometer 160, a direct current source 153 and the solenoid switch 142.

Considered more specifically, it will be seen that a field coil 151 of the delay relay 152 is connected to the plate 156 of the thermionic valve 155. A cathode 159 of the valve 155 is connected to an end of the potentiometer 160, the other end of the potentiometer being connected to the direct current source, with a ground 154 disposed between the direct current source and the potentiometer. Grid 157 of the valve 155 is connected to the slider of the potentiometer 160 through a charging condenser 162, and is also connected to the cathode 159 of the tube 155 through a high resistance grid leak 158. The circuit also contains a lead which connects the relay controlled switch 142 with the coil 151 of the delay relay 152, the bleeder resistance 148 being connected into the delay control circuit between the switch 142 and the delay relay.

The contact arm of the delay relay 152 is connected to a common point between the coils 149, 150 of the relays 163 and 164.

Now considering the contact arm relays 163 and 164, it will be seen that each includes a core, at one end of which is disposed a pivoted armature 165, 166, with a relay controlled switch 167, 168 in juxtaposition with the other end. The movement of each pivoted arm is limited by a hinged stop 169, 170, disposed at the end of the armature opposite the pivot. Each armature is equipped with a pawl 171, 172 fastened to the armature at a point near its free end and rigidly attached respectively to the stops 169, 170. Disposed adjacent the end of the pawl is a ratchet wheel 173, 174. The pawls normally are kept from engaging the ratchet wheels by means of the stops 169, and 170, with which are associated springs or counterweights (not shown) one stop being associated with each of the pawls. Both ratchet wheels are rigidly mounted on a rotatable shaft 175, which also carries a rigidly mounted slider 176 of a center-tap potentiometer 177.

Energization of the coil of one of the contact arm relays causes the pawl to engage and move the slider of the center-tap potentiometer. At the same time, however, one of the relay controlled switches 167, 168 is closed. These switches are shunted in parallel with each other across the coil 141 of the relay switch 142. The closing of either switch 167 or 168 thus acts to short circuit and de-energize the coil 141, so that switch 142 opens.

The ends of the center-tap potentiometer 177 are connected in series with a direct current source 178, such as a dry cell and an adjustable resistance 179. A direct potential indicating means 180, such as a millivoltmeter, is connected between the center-tap and the slider of the potentiometer 177 and is thus enabled to measure the potential drop across that portion of the potentiometer lying between the slider and the center tap.

Also connected across the center tap and slider of the potentiometer 177 is a thermocouple 181, disposed within the furnace 103. The thermocouple is also connected to the furnace control mechanism 182 which is operatively associated with the furnace. This furnace control mechanism may be of any of the well known types which operate to change the input of heat into the furnace in response to electrical impulses supplied to it.

For purposes of discussion, the apparatus of Fig. 7 may be considered to comprise the following parts:

1. A test coil, in which a primary alternating current may be subjected to the inductive influence of a magnetizable body, and thus be caused to vary in phase and amplitude.

2. A standard coil in which alternating current may be subjected to the inductive influence of a specimen having the physical properties which are desired in the material passing through the test coil.

3. Means whereby a secondary potential corresponding in amplitude and phase to that passing through the standard coil can be produced. This secondary potential may be described as an artificial electrical standard.

4. A network in which the primary potential in the test coil can be opposed to the secondary potential or artificial standard, with the result that a differential potential, representing both the difference in amplitude and the difference in phase between the potential of the test coil and the potential of the artificial standard is produced. For convenience in discussion, this potential has been called X.

5. A pair of mixer transformers combined with appropriate rectifiers, into one of which is fed the differential potential produced as described above together with a second potential, designated as $Y_1$. Into the second of the mixer transformers is fed the differential potential X, and another potential $Y_2$ which is phase displaced from the potential $Y_1$ by a constant phase angle (which for most purposes is conveniently maintained at 90°). The secondary current product of the mixer into which the potentials X and $Y_1$ are fed ordinarily reflects "in phase" differences between the potential of the test coil, and the artificial standard (assuming X and $Y_1$ to be in phase with each other). Conversely, the mixer into which the potentials X and $Y_2$ are fed reflects "out of phase" differences.

6. An "in phase" control circuit into which the secondary current of the XY₁ mixer is fed so as to energize the relays operatively associated with a potentiometer connected with the heat input control mechanism of the furnace.

7. An "out of phase" control circuit which is also operatively associated with the relays which move the aforementioned potentiometer.

8. A "delay" control circuit adapted to prevent the adjustment of the heat input mechanism of the furnace unless the deviation of the test coil potential from the artificial standard potential is sufficiently prolonged and persistent as practically to require regulation.

9. A thermocouple circuit into which a variable amount of auxiliary direct current may be introduced by means of the aforementioned potentiometer, and 10. A heat control mechanism which will cause variance in the amount of heat introduced into the furnace in response to variations in the current flowing in the thermocouple circuit.

(The parts of the apparatus noted in enumerated paragraphs 6, 7 and 8 are so arranged in Fig. 7 that they must cooperate to produce a movement of the potentiometer which is a part of the apparatus outlined in paragraph 9, although it will be understood that the "delay" circuit may be eliminated if desired, and that either the "in phase" component or the "out of phase" component may be used to actuate the heat control mechanism.)

A detailed explanation of the functions of the various portions of the apparatus (ante) is given hereinafter together with an explanation of the mode of operation.

Let it be assumed that the material being heat treated is passing continuously through the furnace, the quenching blocks, and the test coil and is being rewound on the receiving reel. A standard specimen S having the desired hardness, tensile strength, impact strength, etc., and free from flaws is inserted in the field of the standard coil 109, and the switch 115 is thrown (to the lower position in Fig. 7) so that the standard coil is connected with the first potentiometer 116, the second potentiometer 117 and the rotor coil 114 of the phase shifter. The test coil, of course, is not connected with the potentiometers and the rotor coil at this stage of the operation. With the switch in this position the sliders of the first and second potentiometer are moved, and the rotor coil is rotated until both of the galvanometers 137 and 139 give a minimum or zero reading. When this condition is attained the amplitude and phase of the potential between the lower end and the slider of the potentiometer 117 coincide with the amplitude and phase of the potential in the standard coil. In other words, an artificial secondary standard potential has been created in the bridge network including the two potentiometers, the rotor coil of the phase shifter, and the standard coil. This artificial standard potential balances and opposes the potential of the standard coil.

The balancing of phase is due to the construction of the phase shifter. The inductive effect of the two 90° phase displaced potentials in the primary coils 110 and 111 of the phase shifter upon the rotor coil 114 varies depending upon the angular disposition of the rotor coil, so that a phase having any angular displacement from an arbitrary base point may be set up. Amplitude of the secondary or artificial standard potential is varied by means of the two potentiometers, potentiometer 117 serving for large adjustments while potentiometer 116 acts as a vernier for finer adjustments.

The artificial standard potential having been established, the switch 115 is shifted (to the upper position in Fig. 7) so that the test coil 105 replaces the standard coil 109 in the network which now comprises 105, 116, 117, 114. If the condition of the material passing through the test coil is satisfactory, then the phase and amplitude of the two potentials in the network will balance. However, if either the phase or the amplitude of the test coil potential differs from that of the artificial secondary standard, this difference will be reflected in the secondary currents in the mixer-transformer rectifier circuit 118, 137, 138, the rectifier circuit 119, 139, 140, or both. For purposes of discussion it will be assumed that the phase of the differential potential X corresponds to the phase of the potential Y₁, introduced into the primary coil 120 of the mixer 118, and that the potential Y₂ which is introduced into the primary coil 123 of the mixer 119 is 90° out of phase with the potential X. Mixer 118 will thus reflect amplitude variations, while mixer 119 will reflect variations in phase. Usually, a substantial change in the character of the material passing through the test coil will be manifested both "in phase" and "out of phase", i. e., the potential of the test coil will differ from the artificial standard potential both in amplitude and phase. As previously noted, deviations in hardness and thickness are manifested "in phase", while deviations in hardness and strain are manifested "out of phase".

Even though the variations in physical character of the material passing through the test coil from the desired physical character are very slight, the galvanometers 137 and 139 ordinarily will indicate their presence. If desired, these galvanometers may be of the recording type so that a continuous record of all deviations may be kept. Ordinarily, however, it will not be desirable to let very minor deviations vary the heat treatment operation. Consequently, the resistances of the "in phase" control circuit, the "out of phase" control circuit and the "delay" circuit are made high enough to prevent their actuation by mere minor deviations of an immaterial character.

Assuming, however, that deviations of sufficient magnitude are manifest both in phase and 90° out of phase, the following play of forces takes place in the control circuits. The "90° out of phase" component current flowing in the secondary circuit 119, 141, 139, 140, of the mixer 119 will energize the coil 141 and close the switch 142. Current will thus tend to flow in the "delay" circuit 153, 142, 151, 155, 154. This current will be very slight at first and can only increase gradually for the reason that a charge builds up in the condenser 162 and impedes the increase of current flowing from the plate 156 to the grid 157 of the valve 155. Because the rate of current flow from the plate depends upon the adjustment of the charging condenser 162, the grid leak 158, and the potentiometer 160 which are operatively associated with it, the amount of current flowing in the delay circuit may be varied by adjusting any one of these parts of the apparatus. In practice, however, it is most convenient to adjust the quantity of plate current, and hence the time of delay, by altering the potentiometer setting.

The potentiometer 160 having been set properly, there is a gradual increase in the amount of current flowing in the "delay" circuit to a predetermined value which permits the delay relay 152 to close. The closing of the delay relay 152 permits the energization of the grid-controlled tubes 146 and 147 from the direct current source 153.

The function of the "in phase" component flowing from the secondary coils of the mixer transformer 118 will now be considered. The values of the bias resistor 145 and the bleeder resistance 148 have been chosen so that the grids of the tubes 146 and 147 are sufficiently negative to prevent a slight current (not indicative of a major defect in the material undergoing treatment) from "tripping" the tubes, i. e., permitting current to flow through them. If, however, current of a sufficient magnitude is induced in the secondaries of the mixer transformer 118, then one of the tubes will pass current, energize one of the contact arm relays, and cause the slider of the potentiometer 177 to move in one direction or the other, depending upon the polarity of the actuating electrical impulse.

At the same time the energization of one of the contact arm relays closes one or the other of the short circuit relays and de-energizes coil 141. Switch 142 then opens to de-energize the delay switch 152, which in turn cuts off the supply of current to the plates of the tubes 146 and 147. The original position of all parts of the control circuits are thus resumed. If the displacement of the slider of the potentiometer has been sufficient to cause the correct change in the temperature of the furnace, no further regulation occurs. If not, the "in phase" and "out of phase" components induced in the secondaries of the mixer transformer will again operate (after an appropriate delay) to cause a further change in the temperature of the furnace.

It will be clear that each time the apparatus operates, the slider of the potentiometer 177 is subjected to a predetermined constant angular displacement in one direction or the other. Assuming that at the beginning the slider was located on the center tap of this potentiometer, it will be apparent that any movement of the slider will cause a potential drop between the slider and the center tap. The magnitude of this drop is measured by the millivoltmeter 180, and at the same time this potential drop is superimposed upon the potential set up by the thermocouple 181 in the circuit 177, 181. This superposition of potential (depending upon its sign) may add to or subtract from the potential set up in the thermocouple circuit. In either case the total potential supplied to the furnace control device 182 is changed and the device will operate to supply more or less heat to the furnace.

The mere physical operation of the control device, considered apart from the rather complex cooperative functions of its various parts is simple. The razor blade strip or the like passes continuously and successively through furnace, quenching blocks and test coil. Deviations from the desired physical characteristics of successive quenched sections is reflected in the current indicating means associated with the mixing transformer. A coincidence of "in phase" and "out of phase" deviations of sufficient magnitude actuates the control circuit if these deviations are prolonged over a sufficient time interval. An auxiliary potential is thus introduced into the thermocouple circuit, and in response to the resultant current change the amount of heat supplied to the material passing through the furnace is appropriately increased or decreased.

The time delay feature of the apparatus is important in that it prevents the apparatus from operating when an irregularity of short duration, such as a weld, is encountered. On the other hand persistent deviations in hardness, tensile strength, impact strength, etc. are compensated for in an efficient manner.

The fact that at any moment only the test coil or the standard coil is inserted in the bridge network, is of great value in practical operation in that it enables the operator to balance the network and set up a new artificial secondary standard potential without interrupting the continuous flow of material through sequential operations of heat treatment. If at any stage of the operation it becomes desirable to produce material corresponding to a new or different standard, a standard coil containing the new standard is permitted to replace the test coil in the bridge network momentarily, or until a balance can be obtained with the new artificial secondary standard potential.

A further advantage of the artificial standard resides in the fact that it remains constant, as contrasted with the variable character of a "natural" standard. In other words, the potential in a coil adjacent a standard S tends to vary as the temperature of the standard piece varies. When a standard magnetizable body is exposed to induced electromotive force for a considerable period of time, its temperature increases with a consequent introduction of error in comparative magnetic analysis.

While I have described the invention on the assumption that the phase displacement of the currents $Y_1$ and $Y_2$ supplied to the mixing transformers are 90° out of phase with each other, the apparatus is not limited thereto. The phase displacement between these two potentials need not be precisely 90°, and in fact other angular displacements may prove more satisfactory in the heat treatment of some magnetizable materials, such as steel wire.

When the differential potential X coincides in phase with the potential $Y_1$ the deviations indicated by the galvonometer 137 are solely those of amplitude, phase variations of the differential potential X being observed at the companion galvonometer 139. If, however, the value of the resistor-condenser combination 135, 134 is changed in such a manner that potential X and potential $Y_1$ are no longer in phase, the galvonometer 137 will reflect an arbitrary mixture of phase and amplitude variations.

Amplification devices can be inserted at various points in the several circuits of the apparatus should it be necessary to augment any of the electrical impulses employed to actuate the apparatus.

If mere analysis of magnetizable bodies is desired, one may dispense with the automatic regulation of the heat supplied to the material, and employ only the indicating means.

Other modifications of my invention may well occur to those skilled in the art without, however, departing from my inventive concepts.

I claim:

1. Apparatus for magnetic analysis which comprises a plurality of transformers having primary and secondary coils and adapted to induce two currents, proportional to the vector sum and the vector difference respectively of two alternating potentials being investigated, a coil disposable in inductive relationship with a magnetizable body, means for introducing an alternating potential to be investigated from said coil into a primary coil of at least one of the transformers, means for introducing another alternating potential into a primary coil of at least one other transformer, a bridge network each side of which is connected with the secondary coils of the transformers and contains a rectifier, and current indicating means connected to said bridge network.

2. Apparatus for magnetic analysis which comprises a pair of transformers each having primary and secondary coils the sum of which is an uneven number and adapted to induce two currents, proportional respectively to the vector sum and the vector difference of two alternating potentials being investigated when these are impressed across the primary coils of the transformers, a coil disposable in inductive relationship with a magnetizable body, means for introducing an alternating potential to be investigated from said coil into a primary coil of each of at least one of the transformers, means for introducing another alternating potential into a primary coil of at least one other transformer, a bridge network, each leg of which is connected to the secondary coil of one of the transformers and contains a rectifier, a variable resistance in each leg of the bridge, and current indicating means connected with the bridge.

3. Apparatus for magnetic analysis which comprises a plurality of transformers each having primary and secondary coils the sum of which is a multiple of three, said transformers being capable of inducing currents respectively proportional to the vector sum and the vector difference of two potentials undergoing investigation when these are imposed across the primary coils, a coil disposable in inductive relationship with a magnetizable body, means for introducing an alternating potential to be investigated from said coil into a primary coil of each of at least one of the transformers, means for introducing another alternating potential into a primary coil of at least one other transformer, a bridge network having secondary coils of the transformers connected in two legs, a plurality of thermionic rectifiers at least one of which is disposed in each leg of the bridge network, and current indicating means connected across the bridge network.

4. Magnetic analysis apparatus which comprises a plurality of transformers having primary and secondary coils and capable of inducing currents, respectively proportional to the vector sum and vector difference of two alternating potentials undergoing investigation when these are imposed across the primary coils, a coil disposable in inductive relationship with a magnetizable body, means for introducing an alternating potential to be investigated from said coil into a primary coil of each of at least one of the transformers, means for introducing another alternating potential into a primary coil of at least one other transformer, a bridge network having secondary coils of the transformers connected in two legs, a plurality of copper oxide rectifiers at least one of which is disposed in each leg of the bridge network, and current indicating means connected across the bridge network.

5. Magnetic analysis apparatus which comprises a plurality of transformers, the secondary coils in each transformer being twice the number of the primary coils, means for impressing alternating potentials undergoing investigation across the primary coils of the transformers, a coil disposable in inductive relationship with a magnetizable body, means for introducing an alternating potential to be investigated from said coil into a primary coil of each of at least one of the transformers, means for introducing another alternating potential into a primary coil of at least one other transformer, a bridge network, each leg of which contains a rectifier and is connected to a secondary coil in each transformer, and current indicating means connected to both legs of the bridge network.

6. Magnetic analysis apparatus which comprises a plurality of transformers, each of which has two secondary coils for every primary coil, means for inductively associating an alternating electrical potential to be investigated with a magnetizable body, means for introducing said alternating potential to be investigated and at least one other alternating potential into the primary coils of the transformers, a bridge network having two legs, one leg containing a secondary coil of one transformer connected in series addition with a secondary coil of another of the transformers, the other leg containing a secondary coil of one transformer connected in series opposition with a secondary coil of another of the transformers, a plurality of rectifiers, disposed respectively in the two legs of the bridge network, and current indicating means connected across the legs of the bridge network.

7. Magnetic analysis apparatus which comprises a pair of transformers each of which has a plurality of secondary coils, a circuit disposable in inductive relationship with a magnetizable body to be analyzed, means for imposing an alternating electrical potential on said circuit, means for energizing the transformers with a plurality of alternating potentials at least one of which is imposed on said circuit, a bridge network having a plurality of secondary coils of the transformers connected in series addition in one leg and a plurality of secondary coils of the transformers connected in series opposition in the other leg, rectifiers disposed in each leg of the bridge network and adapted to pass current in opposite directions one from the other, and current indicating means connected with both legs of the bridge network.

8. Magnetic analysis apparatus which comprises a plurality of transformers each of which has two secondary coils for every primary coil, a circuit disposable in inductive relationship with a magnetizable body to be analyzed, means for imposing an alternating electrical potential on said circuit, means for introducing said alternating potential and another alternating potential into the primary coils, a bridge network having a leg containing a rectifier and two secondary coils of the transformers connected in series opposition and another leg containing a rectifier and two secondary coils of the transformers connected in series addition, and current indicating means connected to both legs.

9. Magnetic analysis apparatus comprising a plurality of transformers, each having two primary coils for each secondary coil, means for inductively associating a first electrical potential with a magnetizable body to be analyzed, means for introducing a first alternating potential into a primary coil of one transformer, means for introducing another alternating potential into a primary coil of another of said transformers, the remainder of said primary coils being connected together and to said alternating potentials, a bridge network containing a plurality of rectifiers and having one leg in which a secondary coil of one of said transformers is connected, and having another leg in which a secondary coil of the other of said transformers is connected, and a direct current indicating means connected to both legs of the bridge network.

10. Magnetic analysis apparatus which comprises a plurality of transformers each having two secondary coils for each primary coil, means for creating a first and second alternating potential, means for inductively associating the first alternating potential with a magnetizable body to be investigated, means for introducing said first and second alternating potentials into the primary coils, a bridge network having two legs, one containing a secondary coil of one of the transformers connected in series addition with a secondary coil of another of the transformers, the other leg containing a secondary coil of one of the transformers connected in series opposition with a secondary coil of another of the transformers, resistances located respectively in each leg of the bridge network, rectifiers located respectively in each leg of the bridge network, and direct current indicating means connected across the bridge network from leg to leg.

11. Magnetic analysis apparatus which comprises a plurality of transformers each having two primary coils for every secondary coil, means for connecting a primary coil of one of the transformers in series opposition with a primary coil of another of the transformers, means for connecting a primary coil of one of the transformers in series addition with a primary coil of another of the transformers, means for creating a first and second alternating potential, means for inductively associating the first alternating potential with a magnetizable body to be investigated, means for introducing said first alternating potential into one set of interconnected primary coils, means for introducing said second alternating potential into the other set of interconnected primary coils, a bridge network having two legs and a middle lead with a rectifier and a secondary coil of one of the transformers connected in each leg, and current indicating means connected in the middle lead of the bridge.

12. Magnetic analysis apparatus which comprises a plurality of transformers each of which has two primary coils for each secondary coil, primary coils of one of the transformers being connected respectively in series addition and series opposition with the primary coils of another of the transformers, a test coil disposable in inductive relationship with a magnetizable body to be investigated, means for imposing a first alternating potential on said test coil to be influenced by the magnetizable body, means for introducing the influenced alternating potential and another alternating potential respectively into the primary coils connected in series succession and in series opposition, a bridge network having two legs each containing a secondary coil of one of the transformers together with a rectifier, and direct current indicating means connected across the bridge.

13. In apparatus for magnetic analysis having a test coil disposable in inductive relationship with a magnetizable body to be tested and means for imposing an alternating potential on said test coil, the improvement which comprises a pair of transformers each having two secondary coils for each primary coil, means for introducing potential from the test coil into the primary of one transformer, means for introducing a second alternating potential into the primary of the other transformer, a bridge network having two legs one of which contains a secondary coil of each transformer connected to each other in series opposition with a rectifier, and the other of which contains a secondary coil of each transformer connected to each other in series addition with a rectifier, and direct current indicating means connected across said two legs.

14. In magnetic analysis apparatus having a test coil disposable in inductive relationship with a magnetizable body and means for imposing a first alternating potential on said test coil, the improvement which comprises means for creating a second alternating potential, means for varying the phase and amplitude of said second potential, means for opposing the first potential to the second electrical potential to create a differential potential, means for producing a current proportional to the vector summation of said differential potential and a third alternating potential, means for producing a current proportional to the vector difference of said differential potential and the third alternating potential, means for rectifying said currents, and means for measuring the difference between the rectified currents.

15. Apparatus according to claim 14 in which the means for varying the phase and amplitude of the second alternating potential comprises a potentiometer and a phase shifter having a rotatable coil.

16. A method of magnetic analysis which comprises influencing a first alternating potential by inductively associating it with a magnetizable body to be analyzed, opposing the influenced potential with a second alternating potential to produce a differential potential, inducing a secondary current proportional to the vector summation of the differential potential and a third alternating potential, simultaneously inducing a secondary current proportional to the vector difference between the differential potential and the third alternating potential, rectifying the secondary currents thus induced, and determining the difference between the rectified secondary currents.

17. A method of magnetic analysis which comprises influencing a first alternating potential by inductively associating it with a magnetizable body to be analyzed, opposing the influenced potential with a second alternating potential to produce a differential potential, inducing a first secondary current proportional to the vector summation of the differential potential and a third alternating potential, inducing a second secondary current proportional to the vector difference of the differential potential and the third potential, inducing a third secondary current proportional to the vector summation of the differential potential and a fourth alternating potential displaced in phase from the third potential, inducing a fourth secondary current proportional to the vector difference of the differential potential and the fourth potential, rectifying the secondary currents, determining the difference between the first and second rectified currents, and determining the difference between the third and fourth rectified currents.

18. A method of magnetic analysis which comprises influencing a first alternating potential by inductively associating it with a magnetizable body to be analyzed, influencing a second alternating potential by inductively associating it with a magnetizable body of known magnetism affecting properties, producing a third alternating potential corresponding in phase and amplitude with the influenced second potential, opposing the influenced first potential and the third potential to produce a differential potential, inducing a secondary current proportional to the vector summation of the differential potential and a fourth alternating potential, inducing another secondary current proportional to the vector difference of the differential potential and the fourth potential, rectifying the secondary currents, and determining the difference between the rectified currents.

THEODOR ZUSCHLAG.